(12) United States Patent
Kim (10) Patent No.: US 7,349,545 B2
(45) Date of Patent: Mar. 25, 2008

(54) KEY AGREEMENT METHOD IN SECURE COMMUNICATION SYSTEM USING MULTIPLE ACCESS METHOD

(75) Inventor: A-jung Kim, Seoul (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 1199 days.

(21) Appl. No.: 09/816,080

(22) Filed: Mar. 26, 2001

(65) Prior Publication Data

US 2001/0038695 A1 Nov. 8, 2001

(30) Foreign Application Priority Data

Mar. 24, 2000 (KR) ............... 2000-15035

(51) Int. Cl.
*H04L 9/00* (2006.01)
(52) U.S. Cl. .................. 380/283; 380/1; 380/44; 380/45; 380/46; 380/47; 380/277; 380/278; 380/28
(58) Field of Classification Search ............ 380/283, 380/44–47, 279, 1, 278, 28, 277
See application file for complete search history.

(56) References Cited

U.S. PATENT DOCUMENTS

| | | | |
|---|---|---|---|
| 5,307,410 A * | 4/1994 | Bennett | 380/256 |
| 5,732,139 A * | 3/1998 | Lo et al. | 380/28 |
| 5,757,912 A | 5/1998 | Blow | |
| 5,953,421 A * | 9/1999 | Townsend | 380/283 |

(Continued)

FOREIGN PATENT DOCUMENTS

WO 94 08409 4/1994

OTHER PUBLICATIONS

Bennett et al. Quantum Cryptography: Public Key distribution and Coin Tosssing, International conference on Computers, Systems & Signal Processing, Bangalore, India Dec. 10-12, 1984.*

(Continued)

*Primary Examiner*—Kim Vu
*Assistant Examiner*—Beemnet W Dada
(74) *Attorney, Agent, or Firm*—Buchanan Ingersoll & Rooney PC (57) ABSTRACT

A key agreement method for secure communication in a multiple access system is provided.

A key agreement method for secure communication in a multiple access system, the key agreement method includes the steps of (a) a first user, modulating signals from a source by a bit sequence and transmitting the modulated signal, (b) a second user, a legitimate counterpart of the first user, decoding, making decision for each bit of the signal with a detector affected by noise and recording the measured values, (c) the second user, deciding a threshold value of measurement with consideration of other factors such as a transmission rate, tolerable error rates, and a degree of security, (d) the second user adopting as a key string only bits having values beyond the threshold value and ignoring bits falling the erroneous region below the threshold, (e) the second user informing the first user that the n-th bit is adopted, not telling the value of the bit, and (f) the users, the first user and the second user, taking as a key string the values of the n-th bits adopted in (e), and discarding the values of the other bits.

4 Claims, 6 Drawing Sheets

U.S. PATENT DOCUMENTS

| | | | | |
|---|---|---|---|---|
| 6,018,582 | A * | 1/2000 | Francois et al. | 380/256 |
| 6,188,768 | B1 * | 2/2001 | Bethune et al. | 380/278 |
| 6,272,224 | B1 * | 8/2001 | Mazourenko et al. | 380/283 |
| 6,438,234 | B1 * | 8/2002 | Gisin et al. | 380/256 |
| 6,678,379 | B1 * | 1/2004 | Mayers et al. | 380/278 |

OTHER PUBLICATIONS

Bennett et al. Expermintal Quantum Cryptography, 1992.*

Bennett et al. Quantum Informaion Theory, IEEE Transaction on Information Theory, vol. 44, No. 6, Oct. 1998.*

Samuel C. Lomonaco, Jr., "A Quick Glance At Quantum Cryptography", University of Maryland, 'Online, Nov. 23, 1998, pp. 1-54.

* cited by examiner

KEY AGREEMENT METHOD IN SECURE COMMUNICATION SYSTEM USING MULTIPLE ACCESS METHOD

BACKGROUND OF THE INVENTION

Priority is claimed to Application No. 00-15035, filed in the Republic of Korea on Mar. 24, 2000, herein incorporated by reference.

1. Field of the Invention

The present invention relates to encryption by sharing a secrete key, and more particularly, to a key agreement method in a secure communication system using a multiple access method.

2. Description of the Related Art

As communication services have significantly increased and information-oriented society has come, system security and reliability have become issues of great importance. In particular, as services such as an electronic commercial or financial transaction and a network information service increase, the need to protect personal information increases. Accordingly, cryptosystem has become more important than ever.

In cryptosystems, a key is used as an input of encryption or decryption function for scrambling plain text. In the cipher system where plain text is encoded and decoded by encryption and decryption algorithms, the ciphered text and the encryption algorithm are available along the public communication channels for not only legitimate users but also illegitimate users. Therefore, it is important to distribute, store, manage securely keys that are exclusive for legitimate users, and security of a system mainly depends on the security of the keys.

Most conventional cryptosystems use algorithms based on computational complexity and are vulnerable to attacks with a powerful computer as well as physical attacks. Moreover, one of drawbacks of the conventional cryptosystem is that it can always be monitored without the legitimate users being aware of any eavesdropping taking place. When distribution or agreement of private keys are performed via private channels, no matter how robust the physical channel is, there are always chances of the channel being attacked by a malicious eavesdropper. The eavesdropper may be able to obtain the value of the key by tapping or cloning the transmitted key signals, produce the signals based on the measured value, and re-transmit the signals to the other legitimate user. Therefore, the legitimate users cannot be sure whether the communication line is attacked, or when eavesdropping occurs.

Conventional public-key cryptosystems are based on computational complexity. But the advent of a powerful computer working on new algorithms such as the quantum computer has been a threat to the conventional cryptosystems.

For example, methods using complex algorithms include the public key, knapsack method (U.S. Pat. No. 4,218,582) and RSA (Rivest, Shamir, and Adleman) system (U.S. Pat. No. 4,405,829), and these methods are based on mathematical complexity. The cipher systems not based on mathematical complexity include the key distributing system by quantum cryptology (U.S. Pat. No. 5,307,410 and U.S. Pat. No. 5,515,438). However, since light used in the quantum cryptosystem should be in the single photon state, in the coherent state with very low power, or in the state which is difficult to generate, it has many obstacles in utilizing the quantum cryptosystem in practice in the very near future. Furthermore, since signal amplification is impossible in quantum cryptosystem, it is not suitable for long-haul communication.

SUMMARY OF THE INVENTION

The present invention devises ways of attaining secure communication against an adversary and it is an object of the present invention to provide a key agreement method for secure communication in a multiple access system. It provides ways to detect the extent of eavesdropping and thus makes eavesdropper s attempts futile. With the protocol of the present invention, security enhancement is achieved on a physical layer without modifying configurations and topologies of communication systems. It is easy to implement in conventional communication systems.

To achieve the above object, there is provided a key agreement method in a multiple access communication system, comprising the steps of (a) a first user, modulating signals from a source by a bit sequence and transmitting the modulated signal, (b) a second user, a legitimate counterpart of the user mentioned in (a), decoding, making decision for each bit of the signal with a detector affected by noise and recording the measured values, (c) the second user, deciding a threshold value of measurement with consideration of other factor such as a transmission rate, tolerable error rates, and a degree of security, (d) the second user adopting as a key string only bits having values beyond the threshold value and ignoring bits falling in the erroneous region below the threshold, (e) the second user informing the first user that the n-th bit is adopted, not telling the value of the bit, and (f) the users, the first user and the second user, taking as a key string the values of the n-th bits adopted in (e), and discarding the values of the other bits.

BRIEF DESCRIPTION OF THE DRAWING(S)

The above objects, principles and advantages of the present invention will become more apparent by describing in detail a preferred embodiment thereof with reference to the attached drawings in which:

FIGS. 4A through 4D show pulse signal patterns at each position in a time delayed CDMA system as an exemplary system which the present invention can be applied to;

DESCRIPTION OF THE PREFERRED EMBODIMENT(S)

A key agreement method for secure communication in multiple access systems according to the present invention will now be described with reference to the attached drawings.

First, methods of sharing a key for encryption in a cryptosystem will be described.

In a wired communication system with temporary security support or a wireless communication system without extra security-supporting equipments, when the user inputs a specific key at the point of starting the communication, a transmitter terminal is set to or taken off of a security mode and a receiver terminal receiving the specific key signal is also set to or taken off of the security Then, ciphered messages are delivered. The setting of the security mode using the specific key is performed either before the communication set-up or in the middle of communication. At the time of setting the security mode, the secret key of a block cipher to be used for encryption or a clue designating the secret key is transmitted. Since a transmitter encryption and a receiver decryption employ the same algorithm and the same secret key, it is necessary to distribute the secret key to a transmitter and a receiver far away from each other and for both to have the same secret key.

One of methods of distributing the secret key is to transmit the secret key created by the transmitter to the receiver during the setting of the secure mode. That is, after sending one frame bits of the specific patten, which corresponds to the setting of the secure mode, the next frame bits, encrypted with a master key and then transmitted, are taken as the secret key. All the terminals may have the same master key and the master key is kept by a responsible institution such as a trust authority or a key escrow.

Another method is to designate one from the key set stored at the terminals of the transmitter and the receiver during the security mode setting. In sending one frame bits for the security mode setting, a part of one frame bits has the specific pattern corresponding the secure mode setting, and the remaining bits are used to represent the indices of the secret keys which are stored in the terminals. In conventional wireless communication systems, the secret key set stored at the terminals in advance comprises the keys installed by a terminal provider and the keys inputted by a subscriber for oneself.

Other than those, in the process to which the present invention is applied, two users agree to adopt as the secret key a part of bits from a bit sequence transmitted through a crypto channel. The bit sequence to transmit is generated by inputting arbitrary numbers or by using a random number generation function. One of the secret keys distributed with this method can then be designated for encryption during the setting of the security mode with the second method mentioned above.

Since the two users can exchange and have the same secret key through a public channel without installing additional physical security equipments, the method of the present invention is easy to implement in various kinds of communication systems in practice.

The key agreement method of the present invention in cryptosystems not only prevents an eavesdropper from obtaining the correct value of the secret key agreed between the users, but also enables to know if eavesdropping takes place and estimates the degree of eavesdropping. The former function is fulfilled by making the eavesdropper have uncorrelated measurement results to the legitimate user by using detector noise and intermodulation noise or cross-talk generated from the other channels in a multiple access system such as a code division multiple access (CDMA) system and a wavelength division multiple access (WDMA) system. The second function can be achieved by estimating a degree of contamination created by the eavesdropper s tapping and retransmittiing the bits.

Figure 1:
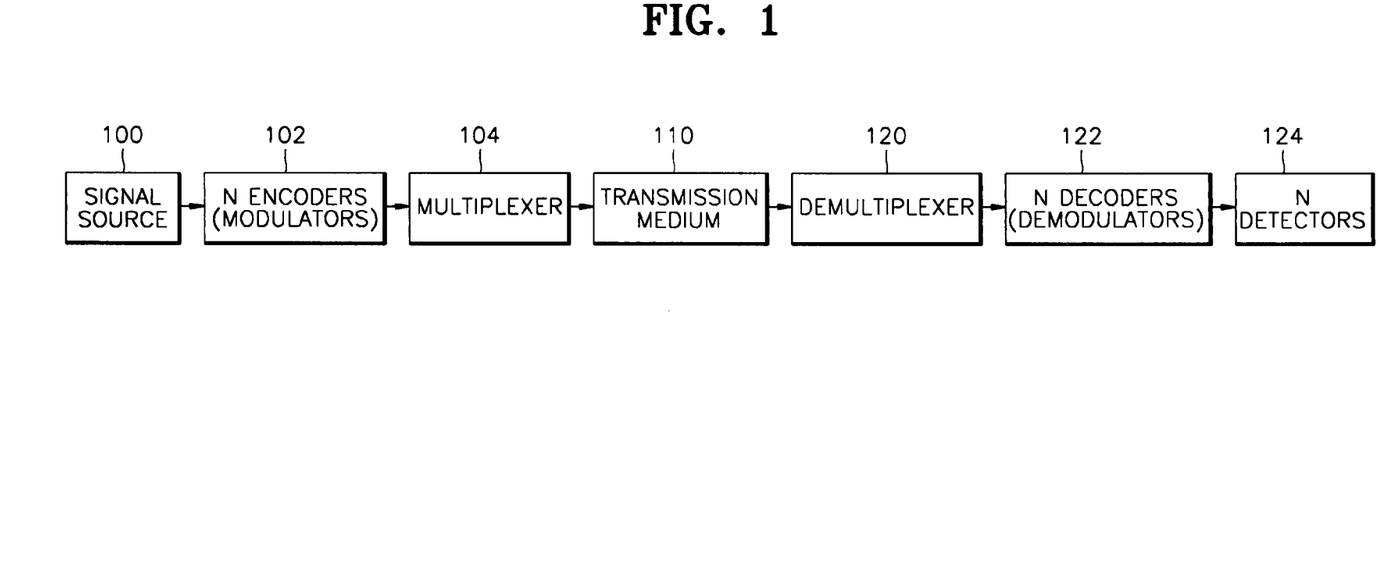
FIG. 1 is a block diagram showing the structure of a communication channel of a general communication system, which can also be used as a cryptographic channel to which the present invention is applied.

FIG. 1 is a block diagram showing the structure of a communication channel of a general communication system, which can also be used as a cryptographic channel to which the present invention is applied. The communication system includes N encoders (or modulators) of key generators 102, a multiplexer 104, a transmission medium 110, a demultiplexer 120, N decoders (or demodulators) 122, and N detectors 124.

The general communication structure shown in FIG. 1 is used as a cryptosystem configuration of the present invention in distributing a secret key. The user on a transmitting side, who is the generator of the key, modulates a signal from a source with an encoder (or modulator) 102 to produce a sequence of arbitrary bits independently of users on other channels and transmits the modulated signal. The signals from the users on a transmitting side are combined by the multiplexer (or coupler) 104 and then transmitted via the same shared transmission medium.

The signal is then split by the demultiplexer (or splitter) 120, filtered to have its own channel while passing through the corresponding encoders (or demodulator) 122, and detected by the N detectors 124. The detector 124 is affected by intermodulation noise caused by the signals of other channels as well as detector s intrinsic noise such as thermal noise, short noise, and electric noise.

A modulating apparatus (not shown), connecting the encoder (or modulator) to a random bit sequence generator (not shown), modulates electric signals or optical signals to a sequence of arbitrary bits and a demodulating apparatus (not shown) performs the inverse processes.

Figure 2:
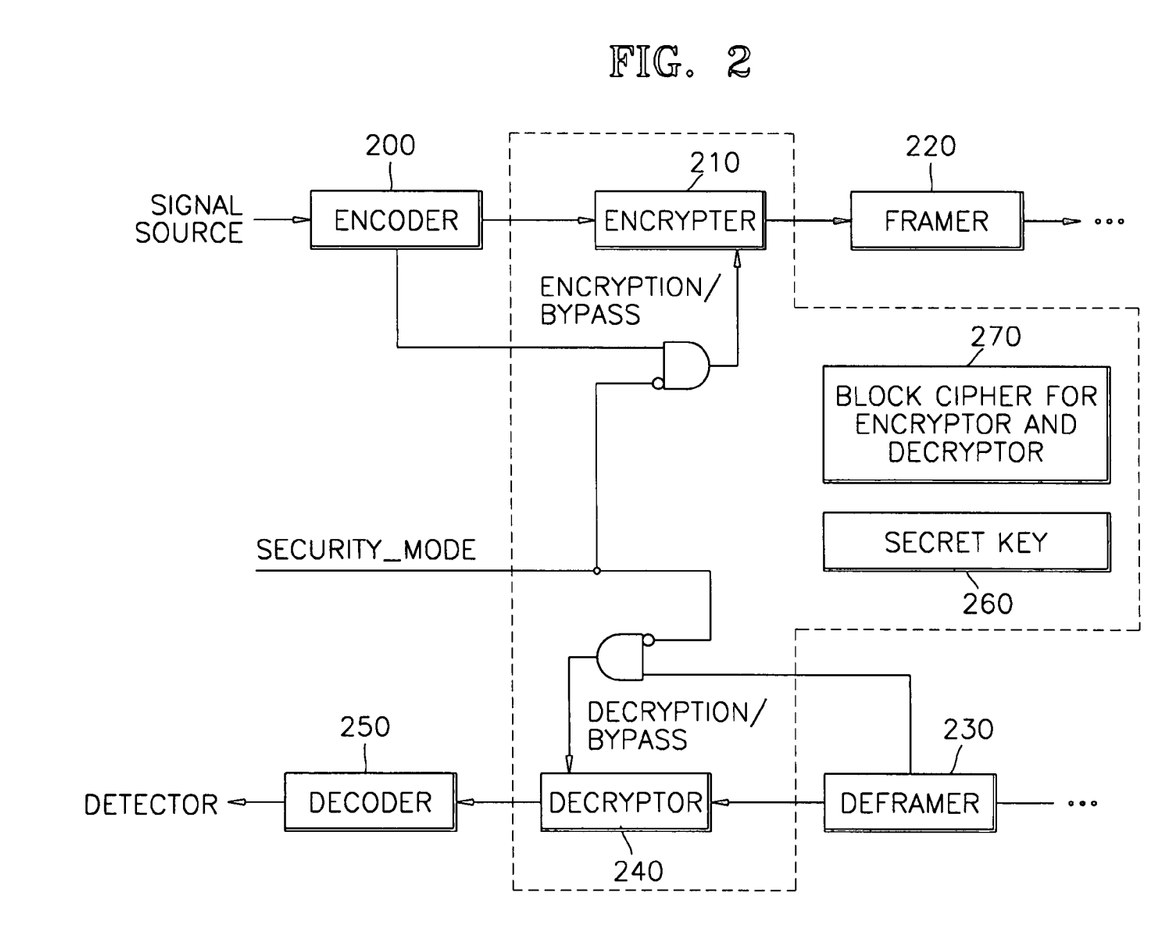
FIG. 2 is a block diagram showing the structures of encryption and decryption with a secret private key shared between users in a general cryptosystem.

FIG. 2 is a block diagram showing the structures of encryption and decryption with a secret private key shared between users in a general cryptosystem. After sharing a secret key 260 between the legitimate users with the key agreement method of the present invention, the plain text, which passed through the encoder 200, is encrypted via an encryption 210 employing a block cipher system 270 such as digital encryption system (DES) or triple DES and a secret key 260 as input to an encryption function. A data frame is created by a framer 220 according to the transmission method.

Figure 3:
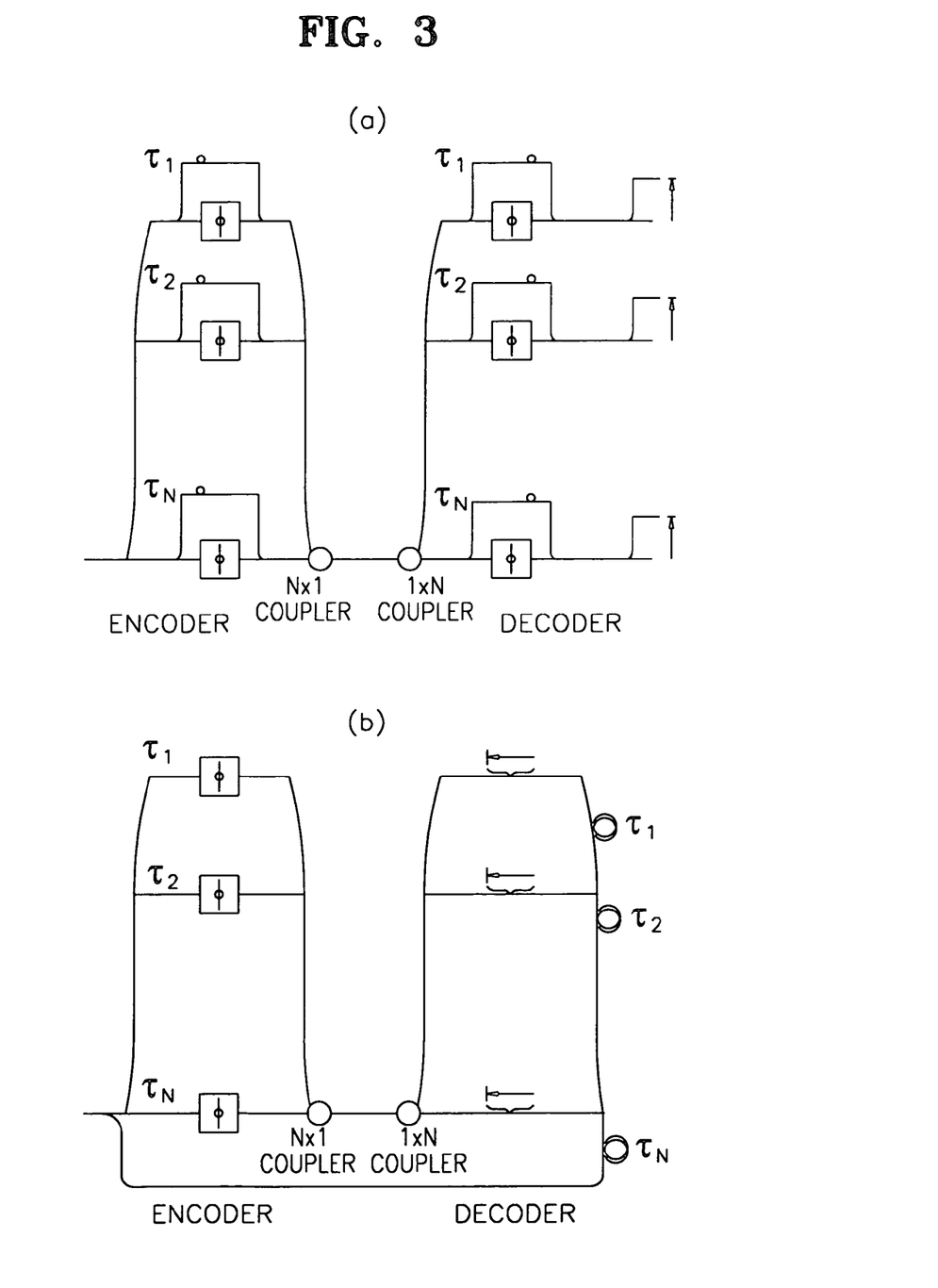
FIGS. 3A and 3B show examples of realizing an encoder and a decoder in the cryptosystem employing optical code division multiple access (CDMA)

FIGS. 3A and 3B show examples of realizing an encoder and a decoder in the cryptosystem employing optical code division multiple access (CDMA).

For communications between N pairs of users, N encoders are connected to each other in parallel and so are N decoders, which match the N encoders respectively. A signal generated by the source of the user on the transmitting side is modulated to a sequence of arbitrary bits via a CDMA encoder. Either each channel has its own light source or various channels use a shared source by power-splitting or spectrum-slicing the shared source in wavelength-hopping CDMA systems.

The modulated signal is combined with signals generated in other channels and is transmitted via common transmission medium. The transmitted signals are split to N channels by a demultiplexer, filtered via matched decoders respectively, and detected.

The encoder is an apparatus to assign amplitudes or frequencies to chips according to the codeword of the system, like an unbalanced Mach-Bender Interferometer (MCI) which can cause time delay or a filter which filters a certain frequency. The time delay caused by the encoder must be greater than the coherent time of the source.

The decoder is an apparatus to differentiate the signal from other unwanted signals with a time delay or a code mixer matching to its counterpart encoder. FIG. 3A corresponds to the case where time delay is intrinsically generated and FIG. 3B corresponds to the case where time delay is extrinsically generated.

Multiple access can be achieved by allocating to each pair of encoding and decoding MIS a unique relative time delay.

Figure 4:
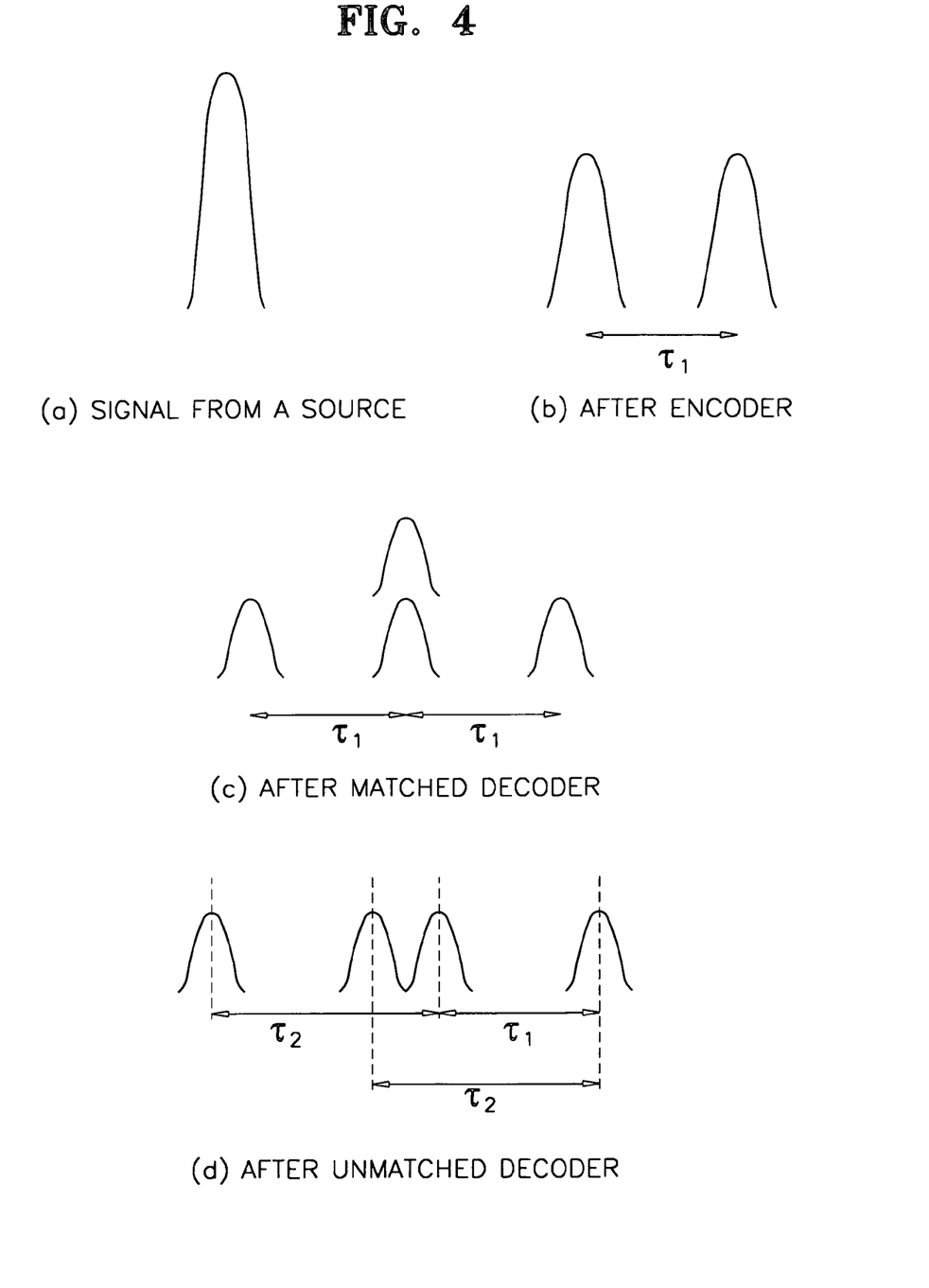

FIGS. 4A through 4D show pulse signal patterns at each position in a time delayed CDMA system as an exemplary system which the present invention can be applied to. The pulse signal from a source shown in FIG. 4A is split into two pulses having time delay A1, after passing through two arms of an interferometer with path difference, which serves as an encoder, as shown in FIG. 4A. The signal is then again split into four pulses, after passing through the decoder on the receiving side. If the time delays of the encoder and the decoder coincide with each other as shown in FIG. 4A, two pulses positioned in the center coherently interfere with each other and the signal is recovered through the decoder with the matched time delay. If the time delay of the encoder and the decoder do not coincide as shown in FIG. 4D, no coherent interference can occur because there is no temporal correlation between the pulses.

Figure 5:
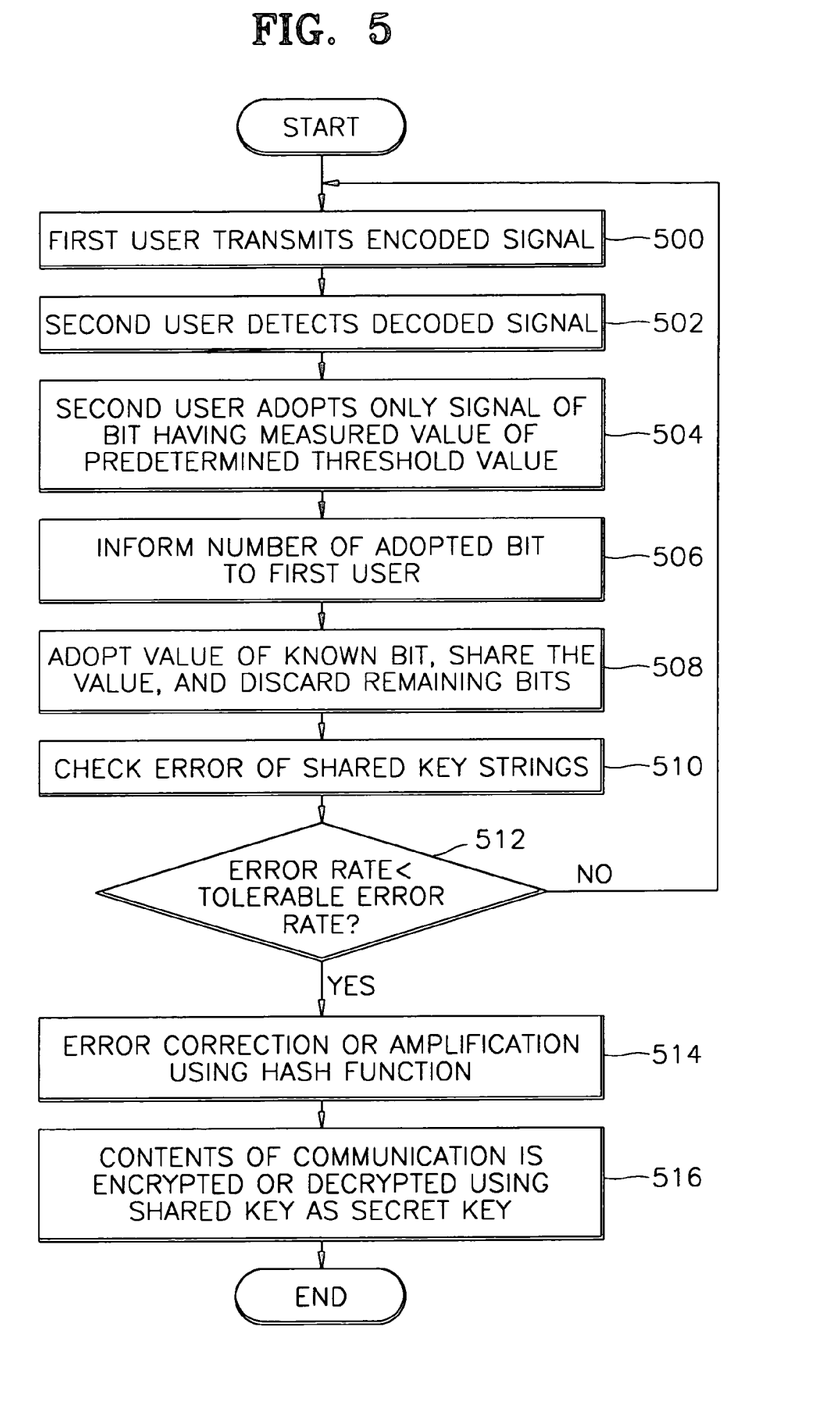
FIG. 5 is a flowchart for illustrating a key agreement protocol in a communication system according to the present invention.

FIG. 5 is a flowchart for illustrating a key agreement protocol in a communication system according to the present invention.

One operation principle of the present invention is to make it difficult for an eavesdropper to distinguish between states of transmitted signals by means of transmitting a weak signal susceptible to noise. Another operation principle is to make an eavesdropper obtain results uncorrelated to the legitimate users results by exploiting device noise with no correlation to each other such as background noise or detector s thermal and electric noise.

Referring to FIG. 5, the first user, modulates the signal from a source to an sequence of arbitrary bits with the encoder and with, for instance, phase reverse keying and transmits the modulated signal (step 500). The second user receives and filters the transmitted signal with the decoder matching to the encoder of the first user and measures the value of bits received by the detector (step 502). The signal transmitted in step 500 is a weak signal susceptible to noise. The measured values of received bits in step 502 has spreading distribution around the real value of the transmitted signal due to intermodulation noise or cross-talk, background noise, and device noise.

The second user adopts as a key only bits having the value beyond a threshold value which was determined in advance and discard the bits falling in the erroneous region below the threshold (step 504). The second user informs the first user that the bits adopted as the key is the n-th bits, without telling their values (step 506). The users, the first user and the second user, take the adopted bits as the key string, based on their measurement (step 508).

After step 508, a parity check or an error check is performed for a subset of bits from the key string shared between the second user and the first user (step 510) and see whether the error rate is below a tolerable value (step 512). In case of the presence of eavesdropping, the eavesdropper s erroneous decisions and retransmissions introduce errors in the bit string of the second user. If the error rate exceeds a tolerable value, it is supposed that there is a possibility of eavesdropping and the transmission is considered unsafe. Thus the key string is to be discarded and the users have to perform the key agreement process again, returning to step 500.

If the error rate is below the tolerable value, the transmission is considered safe. After the key string with a tolerable error rate is obtained, the key is refined with private amplification using error correction or hash functions (step 514). After the key agreement process mentioned above, plain text is encrypted and decrypted with the key shared by the legitimate users (step 516).

Since a weak signal, which is susceptible to noise, is transmitted in step 500, many errors may be produced in the values of the key string measured by the second user. In order to reduce the error rate, the second user takes as the key the bits with values beyond a certain threshold value and discards the unreliable bits falling in the erroneous region below the threshold value in step 504 through step 508.

In the case of presence of eavesdropping in step 500, the values of received bits measured by the eavesdropper has also spreading distribution around the real value of the transmitted signal due to various noise factors. However, since the second user and the eavesdropper use independent detectors and thus the device noise, which affects the measurement result, of the eavesdropper s detector is uncorrelated to that of the second user, the eavesdropper obtains the measurement results uncorrelated to the second user's.

Moreover the eavesdropper has to try to decide each bit of the transmitted signal with optimal decision region divisions, while the second user makes decision at a higher threshold and takes only the bits whose value is beyond the threshold. Therefore the eavesdropper ends up having a higher error rate than the second user in the key string adopted by the legitimate users, the first user and the second user.

The eavesdropper may try to increase correlation with the user's results by retransmitting signals of the measured value to the second user. But eavesdropper s erroneous decisions and retransmissions introduce errors in the second user's bit string. Thus, when the error check is performed in step 510, it is possible to know whether an eavesdropper intervenes by the error rate higher than expected in the key string of the second user.

For example, the dominant noise factor in FIG. 2 is intermodulation noise generated by unwanted signals from the other encoders introducing beating at the second user's detector. In consideration of the intermodulation noise effect, the error rate in the key string of the eavesdropper with the key agreement method of the present invention is obtained by Equation 1.

$$P_e^E \approx \frac{1}{2} erfc\left(\frac{1}{\sqrt{4N^2 \cdot RIN \cdot B_R}}\right) \quad (1)$$

In Equation 1, N, RIN, and $B_R$ represent the number of encoders, that is, the number of pairs of users in a multiple access system, relative intensity noise, and the bandwidth of the detector, respectively. It is assumed that the legitimate user sets a threshold value, θ, and adopts only bits with the measured values greater than the threshold value. The error rate in the key string of the second user due to the intermodulation noise can be expressed as in Equation 2. $P_e^B$ to the case with no eavesdropping, and $$\overline{P}_e^B$$

does to the case where the eavesdropper measures the transmitted signal and retransmits the signal, based on the measurement results.

$$P_e^B \approx \frac{1}{2} erfc\left(\frac{\theta/\sqrt{E}+1}{\sqrt{4N^2 \cdot RIN \cdot B_R}}\right) \quad (2)$$

$$\bar{P}_e^B \approx \frac{1}{4} erfc\left(\frac{1}{2N\sqrt{RIN \cdot B_R}}\right) erfc\left(\frac{\theta/\sqrt{E}-1}{2N\sqrt{RIN \cdot B_R}}\right) +$$
$$\frac{1}{2}\left\{1 - \frac{1}{2}erfc\left(\frac{1}{2N\sqrt{RIN \cdot B_R}}\right)\right\} erfc\left(\frac{\theta/\sqrt{E}-1}{2N\sqrt{RIN \cdot B_R}}\right)$$

E represents the amplitude of the transmission signal.

As an example, for four pairs of users, N=4, RIN=−100 dB/Hz, and θ=3E½, the error rate in the key string of the user is 0.025 while the error rate in the key string of the eavesdropper is 0.26. In addition, if the eavesdropper re-transmits the signals, based on his/her measurement results, in order to increase correlation, the error rate of the key string of the user increases to 0.17. Since the increase in the error rate of the user tells the degree of contamination in the key string, the users can estimate the degree of eavesdropping.

Setting the threshold value to be high enhances the security level, but reduces the data transmission rate as lots of bits in the transmitted sequence are to be discarded. The data rate can be expressed as in Equation 3.

$$R \approx N \cdot \frac{1}{2} erfc\left(\frac{\theta_N/\sqrt{E}-1}{2N\sqrt{RIN \cdot B_R}}\right) \quad (3)$$

For the tolerable error rate of 0.025, the threshold value introducing the tolerable error rate is θ=E½ for two pairs of users, while the threshold value introducing the same tolerable error rate for four pairs of users is set to be about three-times higher than that for two pairs of users. As a result, the data rate is reduced by 62%. Therefore, a high threshold value is required to enhance the security level and increase the number of possible users of the system, at the expense of reducing a data rate.

Figure 6:
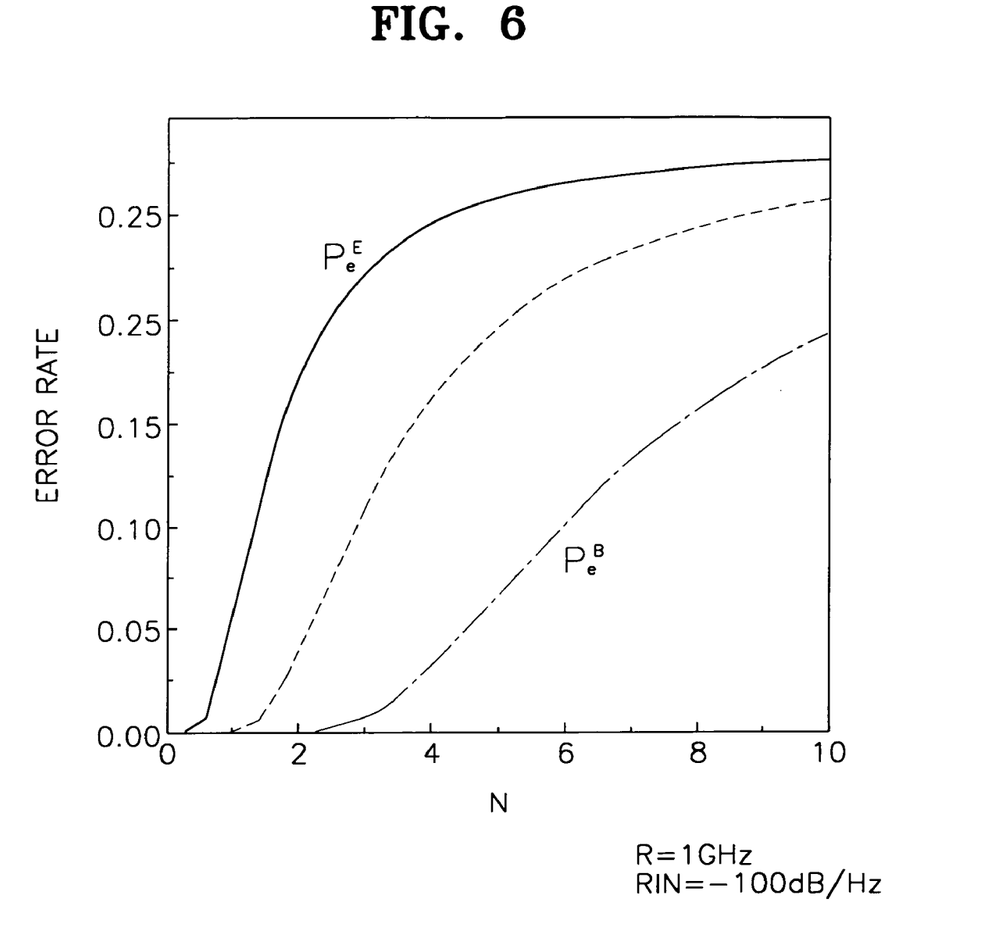
FIG. 6 shows various error rates in a key string when the key agreement method according to the present invention is applied to the optical CDMA system.

FIG. 6 shows various error rates in a key string when the key agreement method according to the present invention is applied to the optical CDMA system.

The dotted line represents the error rate in the key string of the users for the case where the threshold value is set to be θ=E½ and the dashed line for the case where θ=3E½. The solid line corresponds to the error rate in the key string of the eavesdropper. For FIG. 6, R=1 GHz, RIN=−100 dB/Hz. For the certain number of users of the system, the threshold value introducing a certain value of a tolerable error rate can be calculated. Although a high threshold value enhances security of the system, a threshold value must be determined with consideration the data rate of the system and other trade-off factors.

As mentioned previously, since security can be supported on the physical layer with the present invention, complicated mathematical calculations are not needed, unlike the conventional cryptosystem using complicated algorithms. Accordingly, signal processing is simpler and other drawbacks of the cryptosystem based on computational complexity is overcome with the present invention. Along with block cipher system, the security is further enhanced.

With the present invention, an eavesdropper or a illegitimate user cannot obtain the perfectly correlated key to that of the legitimate users and the users can know whether eavesdropping occurs over the transmission line and the degree of eavesdropping as well. That is, when the users detect the higher error rate in the key string, compared to the expected error rate in the experimental environment with no eavesdropping, one can estimate the degree of contamination induced by the eavesdropper retransmitting the signal. It is possible to sense to what degree the data is polluted by the tapping by detecting errors generated by the data received when the tapper re-transmits the measured value and comparing the error rate with the error rate expected in an experimental circumstance. The basic principle of making no correlation between the measurement results of the users and those of the eavesdropper is applicable not only to optical communication systems but also to conventional wired and wireless communication systems. The range of application of the present invention is unlimited.

In addition, the present invention exploits various noises induced in the system. Since noise sources are ubiquitous, the present invention can be applied to various types of communication systems. One advantage obtained by using noise is that equipment of high quality and high resolution is not necessary in the approach of the present invention. Accordingly, the present invention can be easily implemented in conventional communication systems with no extra equipment required. Therefore, after using the general communication channels as cryptographic channels over which the secret keys are distributed according to method of the present invention, the user can also reuse the same physical channel to deliver the cipher text.

In addition, when the present invention is employed with CDMA, a number of users can asynchronously transmit signals with no timing synchronization necessary, sharing the whole available band simultaneously. The present invention can establish a practical system with great flexibility which enables bi-directional communication and easy address change.

Moreover, signal amplification is possible in the system with the present invention, unlike the quantum cryptosystem where signal amplification is impossible. Therefore, it is suitable for a wide area network (WAN) environment as well as a local area network (LAN) environment.

The invention has been described with reference to particular embodiments. However, it will be readily apparent to those skilled in the art that it is possible to embody the invention in specific forms other than those of the embodiments described above. This may be done without departing from the spirit of the invention. The embodiments described herein are merely illustrative and should not be considered restrictive in any way. The scope of the invention is given by the appended claims, rather than the preceding description, and all variations and equivalents which fall within the range of the claims are intended to be embraced therein.

What is claimed is:

1. A key agreement method for secure communication in a multiple access system, the key agreement method comprising the steps of:

(a) a first user encoding a signal from a source by a bit sequence and transmitting the signal;

(b) a second user who is a legitimate counterpart of the first user decoding the transmitted signal and measuring the decoded signal;

(c) the second user adopting only bits, on a bit-by-bit basis, having the measured value beyond the threshold value which is predetermined;

(d) the second user informing the first user that the bits adopted are the n-th bits in the transmitted bit sequence, not telling the values of the bits;

(e) the first and second users taking the adopted bits as a key string, and discarding the remaining bits;

(f) selecting a subset of bits from the key string shared by the first and second users and checking errors;

(g) if the error rate obtained in (f) is below a tolerable level, considering the transmission safe, accepting the key string and obtaining a refined key string with amplification such as error correction process; and (h) discarding the key adopted in the step (e) if the error rate obtained in (f) exceeds the tolerable level, returning to the step (a) and performing (a) through (f) until getting the key string which satisfies the condition (g).

2. A key agreement method for secure communication in a multiple access system, the key agreement method comprising the steps of:

(a) a first user encoding a signal from a source by a bit sequence and transmitting the signal;

(b) a second user who is a legitimate counterpart of the first user decoding the transmitted signal and measuring the decoded signal;

(c) the second user adopting only bits, on a bit-by-bit basis, having the measured value beyond the threshold value which is predetermined;

(d) the second user informing the first user that the bits adopted are the n-th bits in the transmitted bit sequence, not telling the values of the bits; and (e) the first and second users taking the adopted bits as a key string, and discarding the remaining bits, wherein the second user uses a receiver affected by mutual modulated noise by another transmitter.

3. A key agreement method for secure communication in a multiple access system, the key agreement method comprising the steps of:

(a) a first user encoding a signal from a source by a bit sequence and transmitting the signal;

(b) a second user who is a legitimate counterpart of the first user decoding the transmitted signal and measuring the decoded signal;

(c) the second user adopting only bits, on a bit-by-bit basis, having the measured value beyond the threshold value which is predetermined;

(d) the second user informing the first user that the bits adopted are the n-th bits in the transmitted bit sequence, not telling the values of the bits; and (e) the first and second users taking the adopted bits as a key string, and discarding the remaining bits, wherein the threshold value of the step (c) is determined by the second user considering at least a transmission rate, a transmission error rate, and a degree of security.

4. The method of claim 2, wherein the threshold value of the step (c) is determined by the second user considering at least a transmission rate, a transmission error rate, and a degree of security.

* * * * *